United States Patent [19]
Walling et al.

[11] 4,379,435
[45] Apr. 12, 1983

[54] DRYING OVEN FOR INDEFINITE LENGTH MATERIAL

[75] Inventors: Jong-Hein Walling, Beaconsfield; Gerald R. Arbuthnot, Chateauguay; Michel Gervais, Verdun, all of Canada

[73] Assignee: Northern Telecom Limited, Montreal, Canada

[21] Appl. No.: 312,652

[22] Filed: Oct. 19, 1981

[51] Int. Cl.³ .................. B05C 3/172; B05C 11/00
[52] U.S. Cl. ................................ 118/643; 118/68; 118/420
[58] Field of Search ............... 118/67, 68, 420, 642, 118/643; 34/41, 155

[56] References Cited
U.S. PATENT DOCUMENTS 2,434,169  1/1948  Larsen ........................ 118/67 X
4,174,677  11/1979  Nagano et al. ................ 118/67

Primary Examiner—John P. McIntosh
Attorney, Agent, or Firm—R. J. Austin

[57] ABSTRACT

A drying oven for an indefinite length of material having a drying chamber surrounded by an annular heat exchanger, the drying chamber having an inlet and outlet for material passing through it. The heat exchanger has heat exchange members defining flow passages extending axially and around the chamber and having an incoming passage interconnected with an outgoing passage by means of the drying chamber.

4 Claims, 3 Drawing Figures

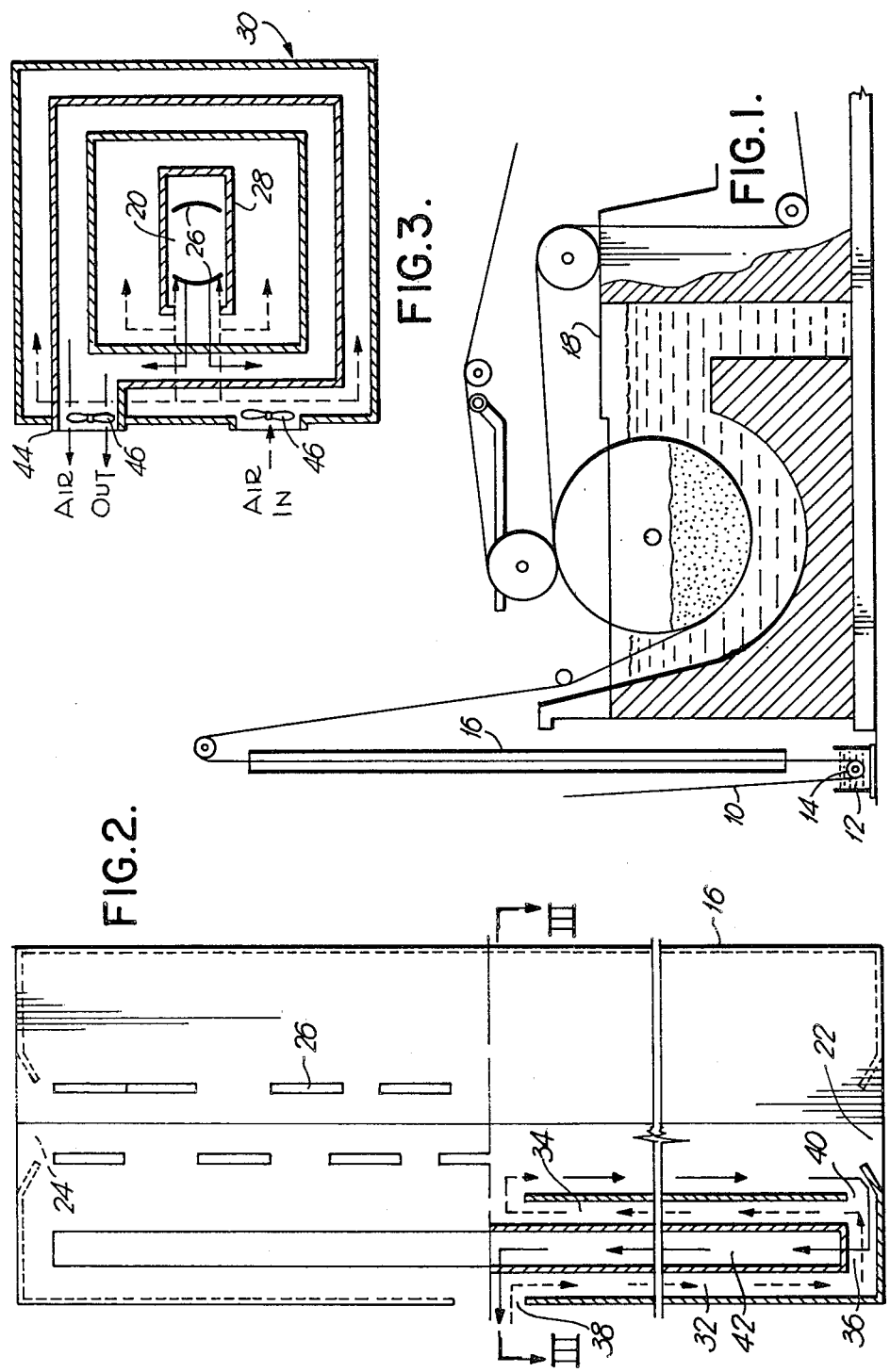

DRYING OVEN FOR INDEFINITE LENGTH MATERIAL

This invention relates to a drying oven for indefinite lengths of material.

Drying ovens are well known for drying indefinite lengths of material after certain processing operations. The ovens may be necessary to dry coatings or impregnations of material which contain water or solvents. In order to dry these materials, dry air is passed through the ovens and through a heating zone in order to entrain evaporated materials and dispose of them outside the oven. In many cases, insulation has to be provided around the ovens in cases where heat radiation could cause damage to other equipment or personnel and this insulation adds substantially to the oven size without assisting in any way in the efficiency of the drying procedure. For instance, in the drying of certain materials such as layers of material placed upon electrical coductors during manufacture of cable, any oven may be of relatively small cross-sectional area compared to the total area including the insulation required to provide a surface temperature of the oven which is within an acceptably low range.

It would be advantageous if the insulation normally provided for ovens of this type were to be replaced while still effectively lowering the temperature at the outside surface of the structure and assisting to increase the efficiency of the oven.

Accordingly, the present invention provides a drying oven for an indefinite length of material comprising a structure defining a drying chamber having an inlet and an outlet for the indefinite length passing through the oven, the chamber surrounded by an annular heat exchanger comprising a plurality of heat exchange members which between them define and separate flow passages extending axially of the chamber and around the chamber, at least one of the passages being a passage for incoming gas to the chamber and another of the passages being a passage for outgoing gas from the chamber, and each of the passages having a gas inlet and a gas outlet to effect flow of gas along the passage, the outlet of a gas incoming passage and the inlet of a gas outgoing passage interconnecting said passages with the chamber at axially spaced positions to effect passage of gas along the chamber.

It is preferable to have the inlet and outlet of each passage spaced in the axial direction of the chamber to effect movement of the gas along the passage in the axial direction.

In the above oven, as many gas incoming and gas outgoing passages may be provided as is desired. In a case where more than one passage is provided for incoming or outgoing gas, then the incoming or outgoing passages, as the case may be, alternate outwardly through the exchanger from one passage to another. With such a structure, where more than one incoming or outgoing passage is provided, then the incoming or outgoing passages, as the case may be, should be disposed in series with one passage having an outlet communicating with an inlet of another passage.

The invention is particularly applicable for use in the manufacture of an insulated electrical conductor for the drying of adhesive coating given to the conductor before the application to the adhesive of a pulp insulation.

Accordingly, the invention also includes apparatus for providing an indefinite length of electrical conductor with pulp insulation comprising an adhesive applicator to apply adhesive to the electrical conductor, a drying oven downstream from the applicator, the drying oven comprising a structure defining a drying chamber having an inlet and an outlet for passage therethrough of the conductor, the chamber surrounded by an annular heat exchanger comprising a plurality of heat exchange members which between them define and separate flow passages extending axially of the chamber and around the chamber, at least one of the passages being a passage for incoming gas to the chamber and another of the passages being a passage for outgoing gas from the chamber, and each of the passages having a gas inlet and a gas outlet to effect flow of gas along the passage, the outlet of a gas incoming passage and the inlet of a gas outgoing passage interconnecting the chamber with each passages at axially spaced positions to effect passage of gas along the chamber.

One embodiment of the invention will now be described, by way of example, with reference to the accompanying drawings in which:

FIG. 1 is a diagrammatic view in side elevation of apparatus for continuously providing an electrical conductor with pulp insulation;

FIG. 2 is a multi cross-sectional view in the same elevation as in FIG. 1 through an oven and heat exchanger assembly forming part of the apparatus in FIG. 1 and on a larger scale, the multi cross-section showing heat exchange passages through the exchanger; and FIG. 3 is a cross-sectional view through the oven and heat exchanger assembly of FIG. 2 taken along lines III—III in FIG. 2.

As shown in FIG. 1, in apparatus for providing an indefinite length of electrical conductor with a pulp insulation covering layer, the conductor 10 is fed through an adhesive bath applicator 12 by passage around a roll 14 submerged in the applicator. The adhesive coated conductor then passes vertically upwardly through a drying oven 16 and out from the top of the oven to be then passed downstream through a conventional pulp bath 18 before continuing through further drying stages. As shown by FIGS. 2 and 3, the drying oven 16 has an oven drying chamber 20 for passage therethrough of the conductor 10 from an inlet 22 at the bottom of the chamber to an outlet 24 at the top. The chamber is of rectangular section as shown in FIG. 3 and houses vertically positioned infrared drying elements 26 which are disposed at intervals and in staggered relationship along the length of the chamber. The infrared elements are quartz based emitter elements such as are available from Casso-Solar Corporation or from Elstein of West Germany.

The chamber 20 is defined by a rectangular structure 28 which provides the inside surface of a heat exchanger 30 which surrounds the chamber 20 and extends axially of the chamber from end to end. The heat exchanger comprises a passage system for incoming air to the chamber and also a passage system for outgoing air from the chamber. The ingoing and outgoing passages of these two systems are symetrically positioned with regard to a horizontal center line through the exchanger as shown by FIG. 2. Accordingly, the passages on one side of the center line only will be described with the understanding that the passages at the other side of the center line are identical in construction but are of opposite hand to that which is described.

FIG. 2 shows the series of passages as represented beneath the horizontal center line. As shown by FIG. 2, the incoming passages comprise an outer annular passage 32 which communicates with an inner incoming passage 34, the two passages being connected in series by connecting passageways 36 at the lower end of the heat exchanger. An inlet 38 for incoming air is provided at the top of the passage 32 for air, from outside the heat exchanger, and an outlet for the incoming air is disposed at the top of the passage 34. Hence, incoming air must travel down the passage 32 and upwardly to the passage 34 before entering the chamber 20.

The outgoing air is conveyed through an inlet 40 on the lower end of the chamber 20 and into an outgoing passage 42 which has its outlet at the upper end of the passage as shown in FIG. 2. Thus the outgoing air must travel upwards along the passage 42 before leaving the heat exchanger.

In use of the oven and heat exchanger, while the adhesive coated electrical conductor is travelling upwardly through the chamber 20 to be dried by heat provided by the heaters 26, the air passes continuously through the series of passages at each side of the horizontal center line. For this purpose, fans 46 are provided at the inlets and outlets for the air as shown, for instance, in FIG. 3. As shown by the arrows indicating the direction of the air, because the outlet for the incoming air from passage 34 is at the top of the passage 34 whereas the inlet 40 to passage 42 is at the base of the chamber, then the air from one to the other must travel downwardly through the chamber 20 to take with it heat and moisture from the chamber obtained from the infrared elements and from the adhesive. The air passing downwardly through passage 32 and upwardly through passage 34 is opposite in direction from the flow of the air down the chamber 20 and upwardly through the passage 42 whereby good heat exchange characteristics are obtainable through the walls of the passages.

The passages of the heat exchanger are defined by heat conductive plates which are preferably made from aluminum. It is found that with the use of this structure, the air entering the chamber 20 is preheated and dried to a degree to provide less humid incoming air than is possible using ambient air directly into the chamber. Because the incoming air is preheated, it assists the infrared heaters in drying the adhesive whereby less power is required to obtain the degree of drying which would otherwise be necessary. Hence the energy consumption of the oven is lowered while the thermal efficiency is increased by the use of the heat exchanger.

In the above structure, outlets for condensate may be provided at the base of the passage 42 to allow a run-off for the condensate.

What is claimed is:

1. A drying oven for an indefinite length of material comprising a structure defining a drying chamber having an inlet and an outlet for the indefinite length passing through the oven, heating means within the chamber to directly dry the material, the chamber surrounded by an annular heat exchanger comprising a plurality of heat exchange members which between them define and separate flow passages extending axially of the chamber and around the chamber, at least a first of the passages being a flow passage for incoming gas, having an inlet for said gas and having an outlet leading into the chamber at a first location, and a second of the passages being a flow passage for outgoing gas from the chamber, having a gas inlet leading from the chamber at a second location spaced from the first location to cause gas flow through said chamber to pass across said heating means, said second passage also having a gas outlet to effect flow of gas heated in the chamber outwardly from said chamber, the heat exchange members provided to cause heat transfer from outgoing gas in said second passage to incoming gas in the first passage.

2. An oven according to claim 1, wherein the inlet and outlet of each passage are spaced in the axial direction of the chamber.

3. An oven according to either of claim 1 or claim 2, wherein a plurality of gas incoming passages are provided, the gas incoming passages being connected together and with the drying chamber in series and alternating outwardly through the exchanger with an outgoing passage or passages.

4. Apparatus for providing an indefinite length of electrical conductor with pulp insulation comprising an adhesive applicator to apply adhesive to the electrical conductor, a drying oven downstream from the applicator, the drying oven comprising a structure defining a drying chamber having an inlet and an outlet for passage therethrough of the conductor, heating means within the chamber to directly dry adhesive on the conductor as it passes through the oven, the chamber surrounded by an annular heat exchanger comprising a plurality of heat exchange members which between them define and separate flow passages extending axially of the chamber and around the chamber, at least a first of the passages being a flow passage for incoming gas, having an inlet for said gas and having an outlet leading into the chamber at a first location, and a second of the passages being a flow passage for outgoing gas from the chamber, having a gas inlet leading from the chamber at a second location spaced from the first location to cause gas flow through said chamber to pass across said heating means, said second passage also having a gas outlet to effect flow of gas heated in the chamber outwardly from said chamber, the heat exchange members provided to cause heat transfer from outgoing gas in said second passage to incoming gas in the first passage.

* * * * *